UNITED STATES PATENT OFFICE.

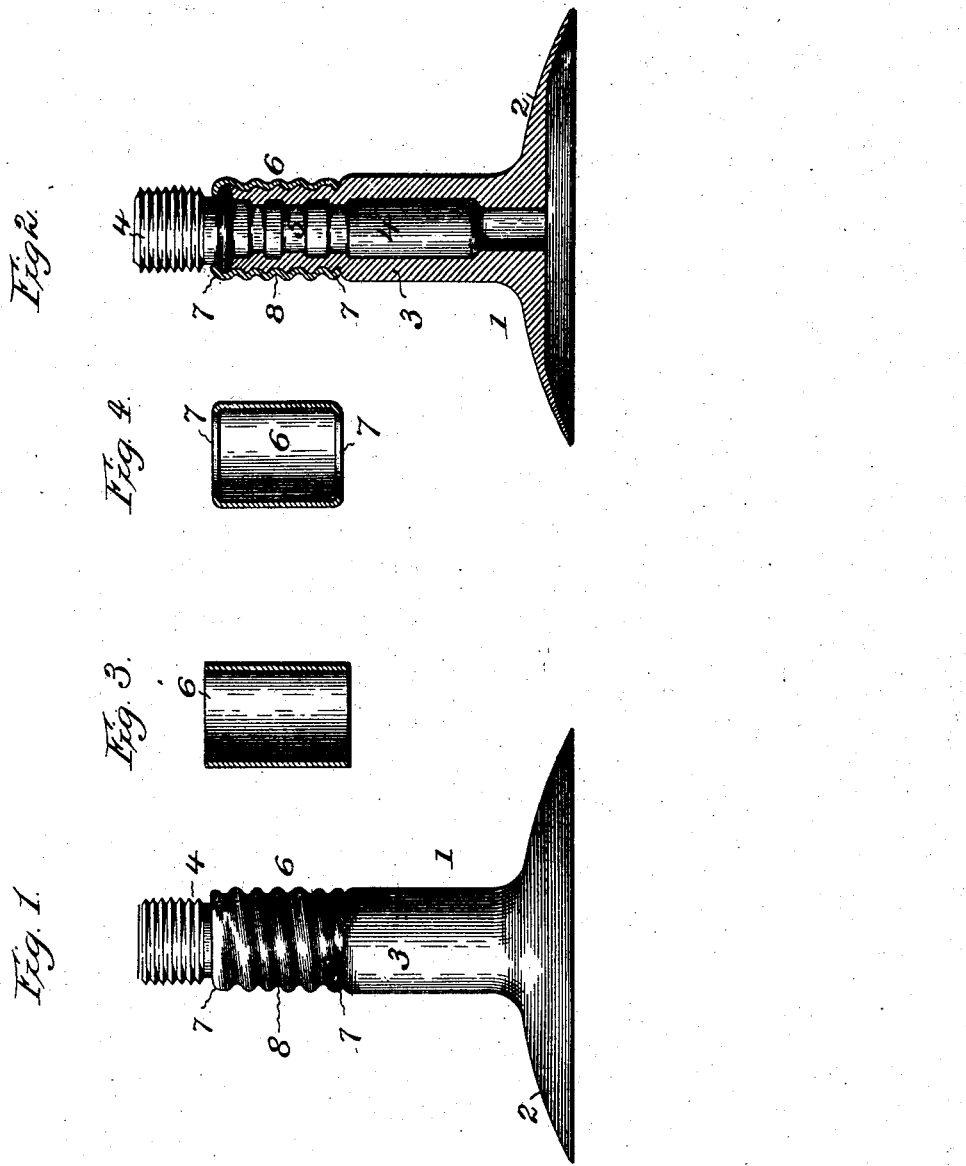

CHARLES R. BARRETT AND ELWOOD C. PHILLIPS, OF CHICAGO, ILLINOIS.

VALVE FOR PNEUMATIC TIRES.

SPECIFICATION forming part of Letters Patent No. 693,991, dated February 25, 1902.

Application filed July 12, 1901. Serial No. 67,949. (No model.)

*To all whom it may concern:*

Be it known that we, CHARLES R. BARRETT and ELWOOD C. PHILLIPS, citizens of the United States, and residents of Chicago, in the county of Cook and State of Illinois, have invented certain new and useful Improvements in Valves for Pneumatic Tires, of which the following is a specification.

This invention relates to that type of valves for pneumatic tires in which a tubular metallic valve-casing containing an outwardly-closing check-valve has connection with the pneumatic tire by a flexible hollow stem, and which valve-casing is adapted for connection with an air-pump to inflate the tire.

The object of the present improvement is to provide a simple, convenient, and effective attachment or connection between the valve-casing and the flexible hollow stem which is capable of a very rapid and economical formation in the operation of connecting said members together and which in addition affords a strong and intimate connection of the parts against any liability to leakage during continued use, all as will hereinafter more fully appear and be more particularly pointed out in the claims. We attain such objects by the construction and arrangement of parts illustrated in the accompanying drawings, in which—

Figure 1 is a side elevation of the valve-casing and the flexible attaching-nipple of a pneumatic tire with the present invention applied. Fig. 2 is a sectional elevation of the same, the flexible attaching-nipple and the fastening means of the present invention being shown in section; Fig. 3, a detail longitudinal section of the blank fastening sleeve or thimble of the present invention; Fig. 4, a similar view of the same in an intermediate stage of its formation to attain the functions of the present invention.

Similar numerals of reference indicate like parts in the several views.

Referring to the drawings, 1 represents the flexible attaching-nipple, consisting of the usual enlarged attaching-disk 2 at its inner end, by which it is attached to the pneumatic tire in the usual manner, and a cylindrical neck 3, which extends away from the tire, so as to be adapted to project through the supporting-rim of such tire, as usual in the present type of pneumatic-tired wheels.

4 is the tubular valve-casing, containing an inwardly-opening check-valve of any usual and approved construction. Such valve-casing is adapted to fit the bore of the cylindrical neck 3 of the flexible attaching-nipple 1 and is provided with the usual circumferential gores 5 for effecting a more extended surface connection between the respective parts.

6 is the clamping-collar of the present invention, which fits upon the outside of the cylindrical neck 3 of the attaching-nipple and is adapted to clamp the same against the valve-casing to effect a substantial and airtight connection between the two parts, and to this end said clamping-collar is formed with internal beads or flanges 7 at its respective ends and with a spiral indentation or groove 8, which extends from end to end of the sleeve, as illustrated in Figs. 1 and 2 of the drawings.

In the practical application of the present invention a plain cylindrical sleeve 6, as illustrated in Fig. 3, is slipped over the cylindrical neck 3 of the attaching-nipple 1, the valve-casing having been previously introduced into place, or subsequently if found most convenient. With the three parts in proper relative position a beading-machine will be employed to bead down the respective beads or flanges 7, after which the same machine will be utilized to chase the spiral indentation or groove 8 in the sleeve and complete the fastening of the parts together.

The present invention is intended to afford a simple, substantial, and air-tight attachment of parts, which is capable of ready and rapid achievement by machinery and afford an inexpensive substitute for the costly yet very efficient hand-wound wire attachment heretofore generally employed in the bicycle trade.

Having thus fully described our said invention, what we claim as new, and desire to secure by Letters Patent, is—

1. The combination with the elongated outwardly-projecting flexible attaching-neck of a pneumatic tire, of a valve-casing fitting the bore of said neck, and a clamping-collar fitting outside said attaching-neck, and provided with inturned flanges or beads at its respective ends, substantially as set forth.

2. The combination with the elongated outwardly-projecting flexible attaching-neck of a pneumatic tire, of a valve-casing fitting the bore of said neck, and a clamping-collar fitting outside said attaching-neck, and provided with indentations or grooves in its surface, substantially as set forth.

3. The combination with the elongated outwardly-projecting flexible attaching-neck of a pneumatic tire, of a valve-casing fitting the bore of said neck, and a clamping-collar fitting outside said attaching-neck, and provided with spirally-arranged indentations or grooves in its surface, substantially as set forth.

4. The combination with the elongated outwardly-projecting flexible attaching-neck of a pneumatic tire, of a valve-casing fitting the bore of said neck, and a clamping-collar fitting outside said attaching-neck, and provided with inturned flanges or beads at its respective ends, and spiral indentations from end to end, substantially as set forth.

In testimony whereof witness our hands this 10th day of July, 1901, at Chicago, Cook county, Illinois.

CHARLES R. BARRETT.
ELWOOD C. PHILLIPS.

In presence of—
ROBERT BURNS,
HENRY A. NOTT.